(12) United States Patent
Rudling

(10) Patent No.: US 8,425,195 B2
(45) Date of Patent: Apr. 23, 2013

(54) WIND TURBINE BLADE

(75) Inventor: Paul Rudling, Calborne (GB)

(73) Assignee: Blade Dynamics Limited, Isle of Wight (GB)

( * ) Notice: Subject to any disclaimer, the term of this patent is extended or adjusted under 35 U.S.C. 154(b) by 1320 days.

(21) Appl. No.: 11/856,506

(22) Filed: Sep. 17, 2007

(65) Prior Publication Data

US 2009/0068017 A1 Mar. 12, 2009

(30) Foreign Application Priority Data

Sep. 11, 2007 (GB) .................. 0717690.2

(51) Int. Cl.
*F03D 11/04* (2006.01)

(52) U.S. Cl.
USPC ........................................... 416/226

(58) Field of Classification Search .......... 416/223 R, 416/226, 234, 238, 239
See application file for complete search history.

(56) References Cited

U.S. PATENT DOCUMENTS

| | | | |
|---|---|---|---|
| 1,638,695 A * | 8/1927 | Leitner .................. 416/204 R |
| 1,685,881 A | 10/1928 | Nixon | |
| 2,493,139 A | 1/1950 | Heath | |
| 2,561,705 A * | 7/1951 | Lochman .................. 416/226 |
| 2,574,980 A | 11/1951 | Meyers | |
| 2,877,503 A * | 3/1959 | Puderbaugh et al. ........ 264/46.4 |
| 3,603,701 A * | 9/1971 | Tarcrynski ............... 416/204 R |
| 3,923,421 A * | 12/1975 | Carter et al. .................. 416/224 |
| 4,332,525 A * | 6/1982 | Cheney, Jr. ................ 416/134 A |
| 4,339,230 A | 7/1982 | Hill | |
| 4,389,162 A | 6/1983 | Doellinger et al. | |
| 4,474,536 A | 10/1984 | Gougeon et al. | |
| 4,739,954 A * | 4/1988 | Hamilton .................. 244/123.1 |
| 4,877,374 A | 10/1989 | Burkett | |
| 5,013,215 A * | 5/1991 | Diehl .......................... 416/178 |
| 5,401,138 A | 3/1995 | Mosiewicz | |
| 5,632,602 A | 5/1997 | Herrmann et al. | |
| 5,660,527 A | 8/1997 | Deering et al. | |
| 6,056,838 A * | 5/2000 | Besse et al. ................. 156/75 |
| 6,796,318 B2 * | 9/2004 | Cohen et al. ................. 135/16 |
| 2006/0133937 A1 | 6/2006 | DeLeonardo et al. | |

FOREIGN PATENT DOCUMENTS

| | | |
|---|---|---|
| DE | 29704151 | 6/1997 |
| EP | 0019691 | 3/1980 |
| EP | 0 258 926 | 3/1988 |
| EP | 258926 A1 * | 3/1988 |
| EP | 1 184 566 | 3/2002 |
| EP | 1 584 817 | 10/2005 |
| GB | 2 416 195 | 1/2006 |
| SU | 571628 | 2/1976 |
| WO | WO 95/20104 | 7/1995 |
| WO | WO 96/38639 | 12/1996 |
| WO | WO 2006/002621 | 1/2006 |
| WO | WO 2009/034291 | 3/2009 |
| WO | WO 2009/034292 | 3/2009 |

OTHER PUBLICATIONS

GB Search Report, Application No. GB0717690.2, dated Jan. 9, 2008.
GB Search Report from Application No. GB0717690.2 dated Apr. 16, 2008.

(Continued)

*Primary Examiner* — Edward Look
*Assistant Examiner* — Aaron R Eastman
(74) *Attorney, Agent, or Firm* — Patterson & Sheridan, L.L.P.

(57) ABSTRACT

Apparatus and methods related to wind turbine blades and manufacturing of the blades.

12 Claims, 8 Drawing Sheets

OTHER PUBLICATIONS

GB Search Report from Application No. GB0717690.2 dated Apr. 28, 2008.
PCT International Search Report for International Application No. PCT/GB2008/002569 dated Oct. 5, 2009.
PCT International Search Report for International Application No. PCT/GB2008/002571 dated Jul. 13, 2009.
Republic of China Office Action for Application No. 200880111769.3 dated Sep. 6, 2011.

* cited by examiner

WIND TURBINE BLADE

CROSS-REFERENCE TO RELATED APPLICATIONS

This application claims benefit of Great Britain patent application serial number 0717690.2, filed Sep. 11, 2007, which is herein incorporated by reference.

BACKGROUND OF THE INVENTION

1. Field of the Invention

The present invention relates to wind turbine blades and methods of manufacture for wind turbine blades.

2. Description of the Related Art

The current approach to manufacturing wind turbine blades is to produce each blade either as two half shells and a spar, or as two half shells with an integral spar. In both cases, the two half shells are bonded together along their edges to form the complete blade.

The blades are typically made from fibre reinforced plastic using either resin infusion or prepreg techniques. In both cases, the blades are produced in large labour and capital intensive facilities and then transported to the location of the wind turbine or wind farm.

The shortcomings of the current approach are primarily related to scale, wind turbine blades typically being 40 m in length or more. As the size of the blades increase, so does the associated cost and probability of manufacturing defects, as large, high quality, components are notoriously difficult to manufacture. Furthermore, as the blades get larger, it becomes more difficult to control the tolerances of the two half shells thereby making it difficult to register the edges of the two half shells in order to join them together.

In use, larger blades are more desirable than smaller blades since they trace a larger envelope and therefore capture a greater proportion of the available wind energy. This means that fewer wind turbines are needed for the same power generation capability.

Notwithstanding the above, the larger the blades are, the more difficult and expensive they become to transport. This is aggravated by the fact that many wind turbines are located in hilly areas which may be inaccessible by road. Occasionally, blades are cut in half to reduce the overall length of the structure to be transported, a field join being made later at the site of the wind turbine. However, this is not a satisfactory solution, involving as it does, the cutting in half of an otherwise structurally sound and expensive component.

Thus it can be seen that, in practice, the size of wind turbine blades produced by conventional techniques are limited by the cost and difficulty of manufacture and also, the cost and difficulty of transport.

SUMMARY OF THE INVENTION

In a first aspect, the present invention provides a modular wind turbine blade having an overall length of at least 30 m, the blade comprising a root at one end for connection to a hub, a spar extending from the root towards a tip at the opposite end, a plurality of frame members extending from the spar, and a plurality of skin panels forming the outer surface of the blade, wherein the blade is made of a plurality of modules none of which has a length greater than 20 m.

A blade made up of modules according this first aspect of the invention is advantageous as the individual modules are easier to handle and more readily transportable than full length blades. The modules may be transported directly to the site of the wind turbine and assembled in a temporary facility. The maximum size of the blade is therefore not limited by the maximum size of component that can be transported to the site of the wind turbine. Typical sizes of modular wind turbine blades according to the present invention might be 35 m, 40 m or 60 m.

In a preferred example the spar comprises a plurality of beams arranged side by side, each beam having a longitudinal web with a flange at either longitudinal edge. A spar made up of smaller components is beneficial as the spar components can be standardised, cheap to produce, elements which can be connected together to form a more complex shape as typically required for a wind turbine blade spar.

One or more of the root, spar, frame members or skin panels is preferably made from fibre reinforced plastic which is a light and strong material suitable for use in wind turbine blade manufacture.

Preferably, none of the modules has a length greater than 15 m to allow for increased ease of handling and transport. More preferably, none of the modules has a length greater than 12 m so that the modules can fit easily within a modern standard 12 m length transport container.

In a second aspect, the present invention provides a kit of parts for a modular wind turbine blade according to the first aspect of the present invention, the kit comprising a plurality of modules wherein none of the modules has a length greater than 20 m. Preferably, none of the modules has a length greater than 15 m and more preferably none of the modules has a length greater than 12 m.

In a third aspect, the present invention provides a method of assembling a wind turbine blade having an overall length of at least 30 m, the method comprising providing a plurality of modules, none of which has a length greater than 20 m, and assembling the plurality of modules into a wind turbine blade.

In a fourth aspect, the present invention provides a modular wind turbine blade, the blade comprising a root at one end for connection to a hub, a spar extending from the root towards a tip at the opposite end, a plurality of frame members extending from the spar, and a plurality of skin panels arranged along the length of the blade and supported on the frame members to form a closed blade section.

The wind turbine blade of the fourth aspect of the present invention is advantageous since the exterior skin of the blade is made up of smaller skin panels which may be more easily fitted together than the two large half shells of the known techniques. The size of the blade is therefore not limited by the size of shell which can be reliably formed and fitted together. The use of a plurality of smaller skin panels also removes the need for large shell moulds used to produce the two half shells in the known techniques which are expensive and difficult for operators to work on.

In a preferred example the spar is a modular spar comprising a plurality of spar units arranged end to end along the length of the blade. This ameliorates the problems and expense associated with transporting a full length spar.

Preferably, the spar comprises a plurality of beams arranged side by side, each beam having a longitudinal web with a flange at either longitudinal edge.

The blade is preferably made up of a plurality of modules none of which has a length greater than 20 m. More preferably, none of the modules have a length greater than 15 m, and more preferably still, none of the modules have a length greater than 12 m.

In a preferred example one or more of the root, spar, frame members or skin panels are made from fibre reinforced plastic.

In a fifth aspect, the present invention provides a method of assembling a wind turbine blade, the method comprising providing a root for connection to a hub, connecting the root at one end of a spar, the spar having a plurality of frame members extending therefrom, and fitting a plurality of skin panels to the frame members along the length of the blade to form a closed blade section. This method avoids the difficulties outlined above with respect to connecting two full length shell sections together.

In a sixth aspect, the present invention provides a modular wind turbine blade, the blade comprising a root at one end for connection to a hub, a spar extending from the root towards a tip at the opposite end, and at least two skin panels which are supported by the spar and which form a closed blade section, wherein the spar comprises a plurality of spar units arranged end to end along the length of the spar.

The wind turbine blade of the sixth aspect of the present invention is advantageous as the problems and expense associated with transporting a full length spar are avoided.

In a preferred example, the spar comprises a plurality of beams arranged side by side, each beam having a longitudinal web with a flange at either longitudinal edge.

It is often desirable to use curved wind turbine blades which are arranged so that the tip is closer to windward when the blade is mounted on a hub in an unloaded configuration. Such a configuration is beneficial since less stiffening material needs to be used in the blade in order to prevent tower strike.

In one preferred example, at least one of the spar units is curved such that the tip of the blade is closer to windward when the blade is mounted on the hub in an unloaded configuration. This arrangement is advantageous since it allows for a curved spar, and thus a curved wind turbine blade, to be formed without the need for complex and expensive curved jigs or moulds. Furthermore, the modular design of the spar allows for either a substantially straight or a substantially curved spar to be produced from a standard set of spar units which may be selected to best fit the conditions in which the wind turbine will be operating. Such an arrangement can, for example, be designed to provide a load shedding capability when the blade is in use.

The at least one curved spar unit is preferably located proximate the tip of the blade. Alternatively, the at least one curved spar unit is located between two substantially straight spar units so that the curve is located away from the tip of the blade. Thus it can be seen that the modular design of the spar allows for considerable flexibility in the wind turbine design without the associated tooling costs.

In a preferred example, the at least one curved spar unit, and/or one or more of the root, spar units or skin panels are made from fibre reinforced plastic. Alternatively the at least one curved spar unit, and/or one or more of the root, spar units or skin panels are made from other suitable materials such as metal.

Adjacent sections of the spar are preferably connected together by mechanical fixings for ease of assembly. Alternatively or additionally, adjacent sections of the spar are bonded together, again, for ease of assembly.

In a seventh aspect, the present invention provides a method of assembling a wind turbine blade, the method comprising arranging a plurality of spar units end to end to form a spar, providing a root for connection to a hub, connecting the root at one end of a spar, and fitting at least two skin panels to the spar to form a closed blade section.

In an eighth aspect, the present invention provides a subassembly for connecting a wind turbine blade to a hub, the subassembly comprising a tubular support member, one end of which is arranged to be connected to the hub, and at least two spaced bulkheads extending across the tubular support member and which are arranged to be supported by the tubular support member, wherein each bulkhead comprises a hole for receiving a spar member of the wind turbine blade such that, in use, a portion of the spar member is supported within the tubular support member by the bulkheads such that the spar extends from the tubular support member.

This subassembly is beneficial as it is less expensive to produce than the prior art root ends which have a circular cross-section at one end for connection to the hub, and a polygonal cross-section at the other end for connection to the spar.

Preferably, the bulkheads comprise a bulkhead assembly consisting of at least two parts for ease of assembly.

The bulkheads could be connected to the ends of the tubular support member. However, in a preferred example, the bulkheads are supported within the tubular support member. This provides additional support for the bulkheads and better transference of bending loads to the tubular support member.

Preferably, the bulkheads are connected to the tubular support member via support mouldings which are themselves connected to the tubular support member. This provides a simple but robust connection of the bulkheads to the tubular support member.

The tubular support member preferably comprises fixing holes for connection to a hub at one end.

In a preferred example, the tubular support member is tapered from one end to the other in order to better conform to the outer profile of the wind turbine blade.

One or more of the tubular support member, bulkheads or spar are preferably made from fibre reinforced plastic which is a light but strong material suitable for use in wind turbine blade manufacture.

In a ninth aspect, the present invention provides a spar for a wind turbine blade, the spar comprising a plurality of beams arranged side by side, each beam having a longitudinal web with a flange at either longitudinal edge, the flanges being located at the outer extremity of the spar.

A spar made up of smaller components is beneficial as the spar components can be standardised, cheap to produce, elements which can be connected together to form a more complex shape as typically required for a wind turbine blade spar.

Preferably one or more of the beams is an open section beam. This is advantageous as it reduces the number of webs, and thereby the amount of material used, in the spar.

Preferably, at least one of the one or more open-section beams is an I-beam or a channel section beam which have readily calculable structural properties.

In a preferred example, the plurality of beams are adhered together for ease of assembly. Alternatively, or additionally, the plurality of open-section beams are connected together by mechanical fixings, again, for ease of assembly.

The flanges preferably comprise pulltruded fibre reinforced plastic. This is beneficial as the pulltrusion of composite components is an almost 100% material efficient process. The cost of material wastage associated with wind turbine blade manufacture may therefore be significantly reduced.

Preferably, the webs comprise multi-axial fibre reinforced plastic which is suitable for bearing torsional loads. Alternatively, the webs may comprise a pulltruded fibre reinforced plastic.

The flanges and webs are preferably adhered together. Alternatively or additionally, the flanges and webs are connected together by mechanical fixings.

In a preferred example, the spar comprises a plurality of spar units arranged end to end along the length of the spar. This alleviates the problems and expense of transporting a full length spar.

Preferably adjacent spar units are connected together at their webs for ease of assembly. Although the flanges of adjacent spar units may also be connected together, this is not necessary for the structural integrity of the spar.

The adjacent spar units are preferably connected together by mechanical fixings. Alternatively or additionally, adjacent spar units are adhered together.

In a preferred example at least one pair of adjacent spar units comprise dissimilar materials. This is beneficial as more expensive, stiffer, material, such as carbon fibre reinforced plastic, can be used in the main load bearing regions of the spar, for example in the central section, and less expensive material, for example glass fibre reinforced plastic, can be used in the remaining sections of the spar.

In one preferred example the height of the webs decrease along the length of the spar such that the flanges of each beam approach one another along the length of the spar in order to produce a taper from one end of the spar to the other.

Similarly, in another preferred example, the width of the spar decreases along the length of the spar. This may be achieved by narrowing the flanges along the length of the spar. Alternatively or additionally, beams of differing lengths may be used to decrease the width of the spar by terminating the outermost beams before the end of the adjacent, inner, beams.

The beams may preferably be of differing heights in order to allow the assembled spar to better conform to the outer curved profile of the blade.

In one example at least one of the beams is offset from an adjacent beam such that the flanges of the at least one offset beam are not coplanar with the flanges of the adjacent beam. This allows a spar having a twist to be formed.

In a tenth aspect, the present invention provides a method of assembling a spar for a wind turbine blade, the method comprising providing a plurality of beams, each beam having a longitudinal web with a flange at either longitudinal edge, and joining the plurality of beams side by side with the flanges located at the outer extremity of the spar. Preferably the method further comprises joining a plurality of spar units end to end along the length of the spar.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
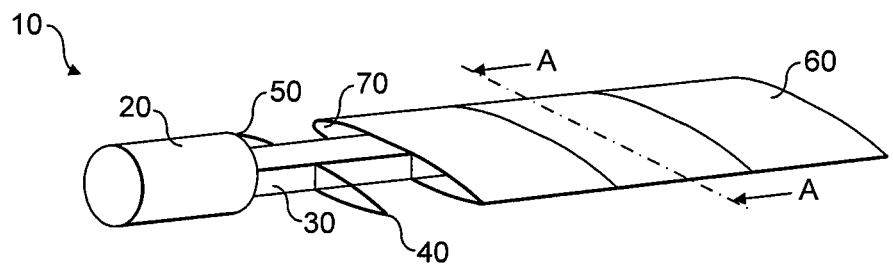
FIG. 1 is a schematic isometric view of a partially completed wind turbine blade.

FIG. 1 shows a partially complete wind turbine blade 10 comprising a load bearing spar 30 which is connected to a root subassembly 20 as will be described in greater detail below. The spar 30 supports frame members 40, 50 onto which skin panels 60, 70 are mounted to form the outer surface of the blade 10.

Figure 2:
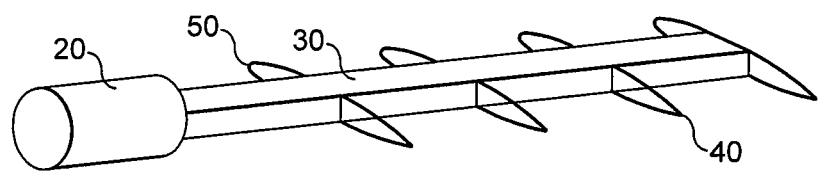
FIG. 2 is a schematic isometric view of the spar, frame and root subassembly of the blade of FIG. 1.
Figure 3:
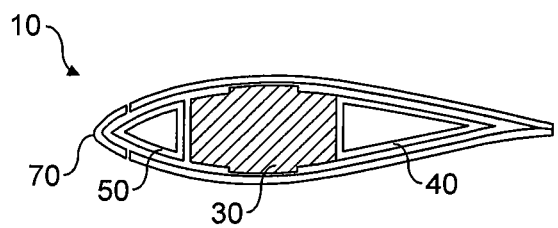
FIG. 3, is a schematic cross-sectional view along the line A-A of FIG. 1.

In the example shown in FIGS. 1 to 3, the frame members 40, 50 are made of carbon fibre reinforced plastic and consist of leading side frame members 50 and trailing side frame members 40. As shown, the frame members 40, 50 are shaped to largely correspond to the cross-sectional profile of the blade 10.

The skin panels 60, 70 are attached to the frame members 40, 50 and spar 30 to form a continuous outer skin. The leading edge skin panels 70 are attached to the leading side frame members 50 and the remaining skin panels 60 are attached to the leading side frame members 50, the spar 30 and trailing side frame members 40.

The skin panels 60 are made of glass fibre reinforced polyester and have a polyester gellcoat which is applied either before or after the skin panels 60 are assembled on the frame. The leading edge skin panels 70 are made of a composite material and have a wear resistant coating which is applied either before or after the leading edge skin panels 70 are assembled.

The root assembly 20, spar 30, frame members 40, 50 and skin panels 60, 70 are glued together in a jig to ensure dimensional accuracy. The jig itself (not shown) is a modular jig comprising a plurality of jig modules none of which exceeds 20 m in length to facilitate transport of the jig modules to the wind turbine assembly site. In this example mechanical fixings such as bolts and clips are also used to connect the various components of the blade 10 together. In an alternative example, only glue or only mechanical fixings may be used.

Figure 4:
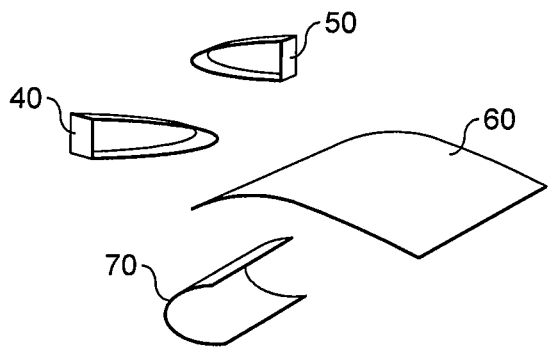
FIG. 4 is a schematic isometric view of the skin panels and frame members of FIG. 1 prior to assembly.

FIG. 4 shows examples of the individual skin panels 60, 70 and frame members 40, 50 which form part of the kit for making the finished blade 10. The skin panels 70, 60 are shaped so that they may be stacked one within another during storage and transport.

Figure 5:
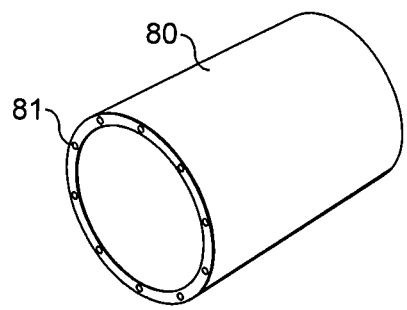
FIG. 5 is a schematic isometric view of a tubular support member which forms part of the root subassembly of FIG. 1.

FIG. 5 shows a tubular support member 80 which forms part of the root subassembly 20 of FIG. 1. The tube 80 is a filament wound glass fibre reinforced plastic tube of approximately 5 m in length. The tube 80 is manufactured on a male mandrel so that it has a precise internal dimension. Threaded holes 81 are located in one end of the tube 80 for connection to the hub of a wind turbine.

Figure 6:
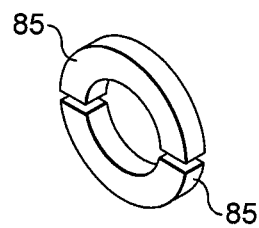
FIG. 6 is a schematic isometric view of a pair of support mouldings which form part of the root subassembly.

A pair of glass fibre reinforced plastic support mouldings 85 are shown in FIG. 6. These support mouldings 85 have an accurate outer curved surface which is achieved either by using a female mould or by machining. The support mouldings 85 are C-shaped with an outer radius of curvature which matches that of the internal radius of curvature of the tube 80.

Figure 8:
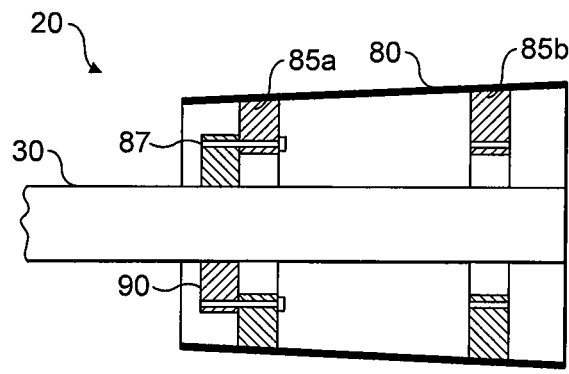
FIG. 8 is a schematic cross-sectional side view of the root subassembly during assembly.
Figure 9:
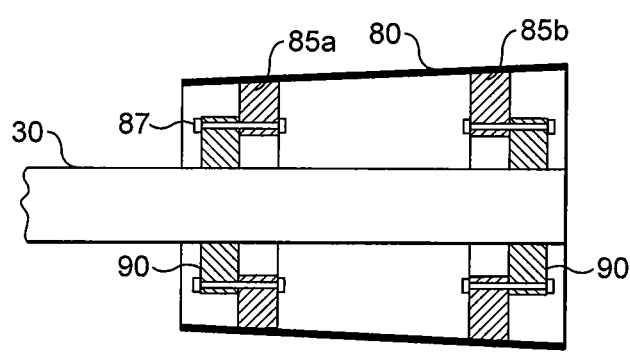
FIG. 9 is a schematic cross-sectional side view of the complete root subassembly.

As shown in FIGS. 8 and 9, two pairs of support mouldings 85 are bonded to the inner surface of the tube 80. The support mouldings, which are approximately 100 mm to 150 mm deep, are bonded approximately 200 mm from either end of the tube 80.

Figure 7:
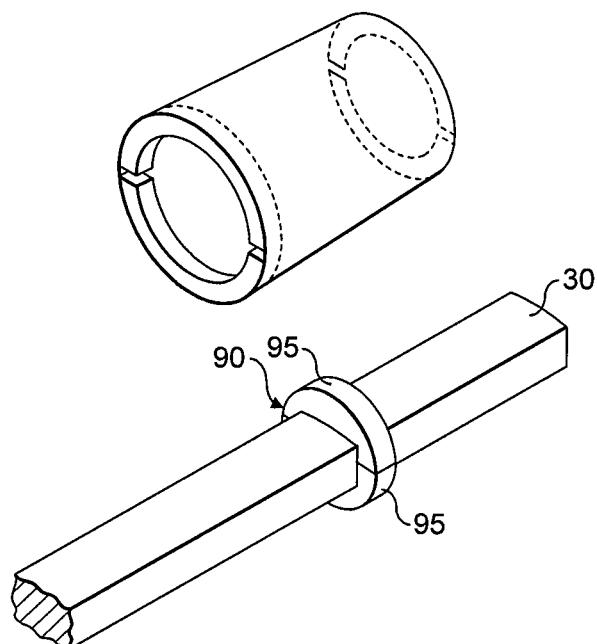
FIG. 7 is a schematic isometric view of a bulkhead attached to the spar of FIG. 1.

FIG. 7 shows a glass fibre reinforced plastic bulkhead 90 bonded to a portion of the spar 30. In this example the bulkhead 90 comprises two halves 95 which are bonded to each other and to the spar 30. In an alternative example, the bulkhead 90 is a single piece with a hole through it to receive the spar 30.

During assembly, a first bulkhead 90 is bonded to the spar 30. The spar 30 is then inserted into the tube 80 from the end opposite to the hub connection end until the bulkhead 90 abuts a first pair support mouldings 85a. The bulkhead 90 is then attached to the support mouldings 85a by adhesive and bolts 87 which extend through the bulkhead 90 and support moulding 85a. A second bulkhead 90 is then bonded to the portion of the spar within the tube 80 and attached to the second pair of support mouldings 85b by adhesive and bolts 87.

Figure 10:
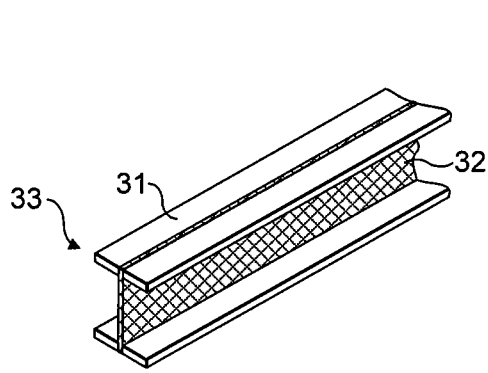
FIG. 10 is a schematic isometric view of an open-section beam which forms a part of the spar of FIG. 1.
Figure 11:
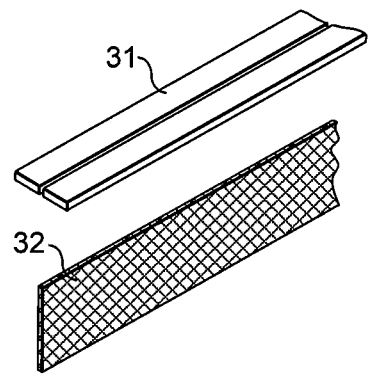
FIG. 11 is a schematic isometric view of the component parts of the open-section beam of FIG. 10.

FIG. 10 shows an open-section I-beam 33 which forms part of the spar 30. The I-beam 33 is itself made up of component flanges 31 positioned either side of a longitudinal web 32 at either longitudinal edge of the web 32. The flanges 31 are made of unidirectional carbon or glass fibre reinforced plastic and the web 32 is made of ±45° multi-axial carbon or glass fibre reinforced plastic. The flanges 31 are formed in a pull-trusion process and have a rectangular cross-section. The flanges 31 may, in an alternative example, have a curved cross-section to fit the outer profile of the blade more closely. However, in order to keep the component parts of the spar as simple as possible it is preferred that the flanges have a rectangular cross-section.

The flanges 31 are adhered to either side of the web 31 proximate the longitudinal edges of the web to form the I-beam 33. Alternatively, the I-beam 33 could comprise two flanges, each having a longitudinal slot for receiving the respective edges of the web. The I-beam 33 is assembled in a jig to ensure dimensional accuracy. In an alternative example, the flanges 31 are connected to the web 32 by mechanical fixings in addition to, or as an alternative to adhesive.

Figure 12:
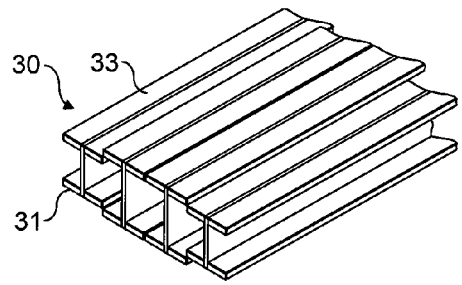
FIG. 12 is a schematic isometric view of a first portion of the spar of FIG. 1.

As shown in FIG. 12, the spar 30 is made up of a plurality of I-beams 33 arranged side by side. As shown in cross-sections B and C of FIG. 14, the flanges 31 are located at either side of the spar 30 in a section taken through the spar. The I-beams 33 are held in a jig to ensure dimensional accuracy and are adhered to one another along the flanges 31. Alternatively, or additionally, the flanges may be connected together by mechanical fixings.

Figure 14:
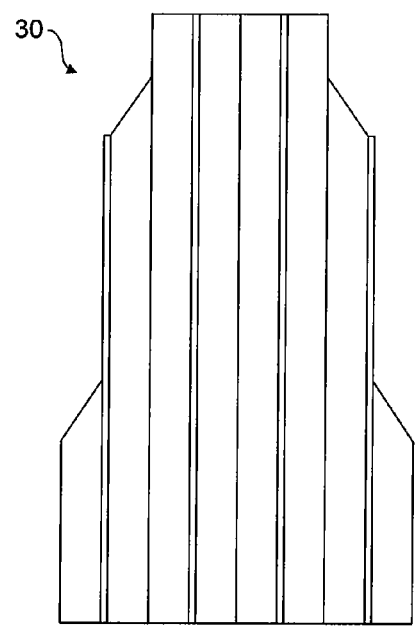
FIG. 14 is a schematic view in plan and cross-section of the spar of FIG. 1.
Figure 14:
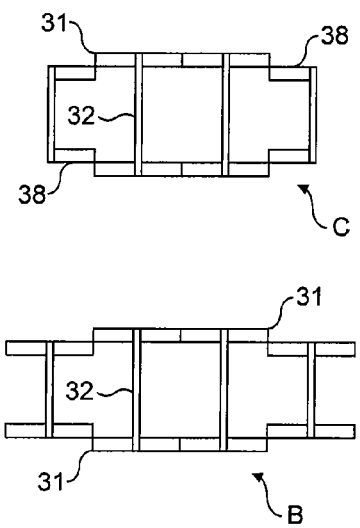

In the example shown in FIGS. 12 and 14, the depth of the spar 30 is greatest in the middle. This configuration is used to account for the curvature of the skin panels 60 which attach to the spar 30 and which define the outer surface of the wind turbine blade as shown in FIG. 3. The depth change between the outermost I-beams 33 and the innermost I-beams 33 is achieved by altering the depth of the web 32. Furthermore, the depth of the spar 30 decreases from the root end to the tip end. This decrease in depth is achieved, in part, by decreasing the depth of the webs 32 from one end of the component I-beams 33 to the other, such that they have a substantially trapezoidal configuration. As described further below, the depth of the spar 30 is also decreased along the length of the spar by reducing the overall depth of the webs 32 in successive spar units 35.

Figure 13:
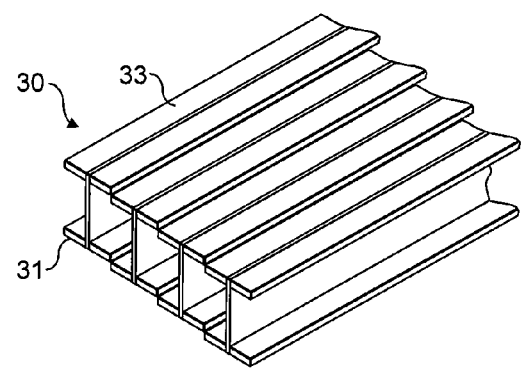
FIG. 13 is a schematic isometric view of a second portion of the spar of FIG. 1.

FIG. 13 shows an another arrangement of the I-beams 33 in a second section of the spar 30 which section includes a twist. In this section the I-beams 33 are arranged side by side with their flanges 31 offset from one another so that the flanges 31 of one I-beam are not coplanar with the flanges 31 of an adjacent I-beam 33. The extent of the offset increases along the length of the spar 30. The twist allows the spar to conform to the outer profile of the blade 10 which twists about the longitudinal axis of the blade.

FIG. 14 shows a view in plan and in cross-section of the spar 30 and illustrates how the width of the spar 30 tapers from the root end to the tip end. This taper is achieved, in part, by dropping off flange sections 31 of the I-beams 33 so that the outermost beams have a channel cross-section (in the shape of a C), rather that an I-beam cross-section. Cross-section B illustrates the widest portion of the spar 30 formed of four I-beams 33, and cross-section C shows a reduced width section of the spar 30 which is formed of two I-beams 33 and two channel beams 38. As will be described further below, the width of the spar 30 is also reduced along the length of the spar by connecting successive spar units 35 having progressively fewer component beams 33, together end to end.

The spar 30 may be formed from a plurality of full length I-beams 33 and/or channel beams 38. However, in the present example, the spar 30 comprises a plurality of spar units 35, each of no more that 12 m in length, joined end to end.

Figure 15:
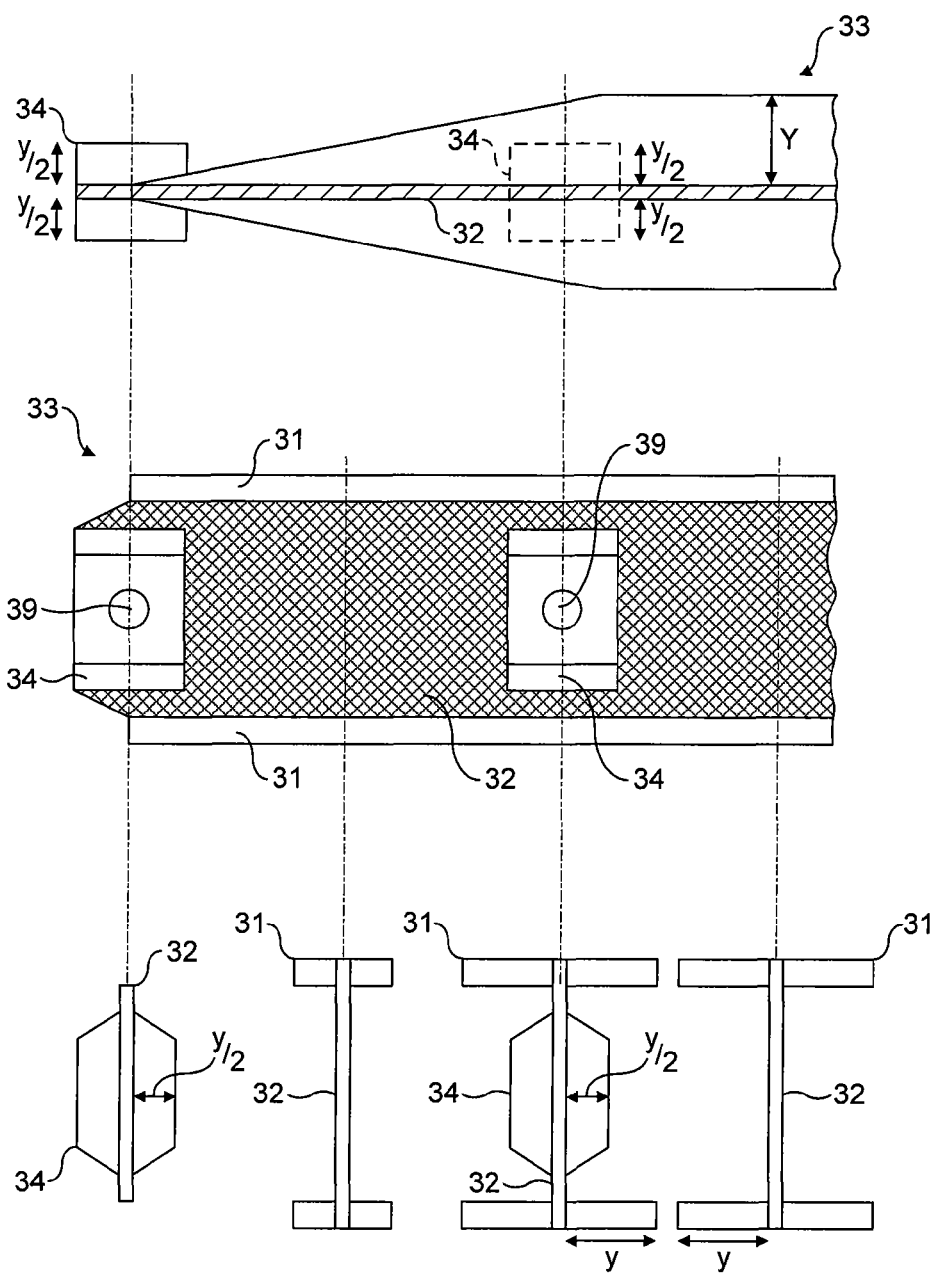
FIG. 15 is a schematic view in plan, side and cross-section of the end of the open-section beam of FIG. 10.

In order to create the join between the spar units 35, each I-beam 33 (or channel beam 38) is terminated in a point as illustrated in FIG. 15. The flanges 31 are tapered down from their maximum width Y to zero at the end of the I-beam 33 over a predetermined length. Bearing blocks 34 made of glass fibre reinforced plastic are bonded and/or mechanically fastened to either side of the web 32 at two positions, one where the flanges 31 begin to taper, and the other centred at the point where the flanges 31 taper to zero. The bearing blocks 34 have a width of Y/2. Each bearing block 34 has a hole 39 to accept a shear pin 36.

Figure 16:
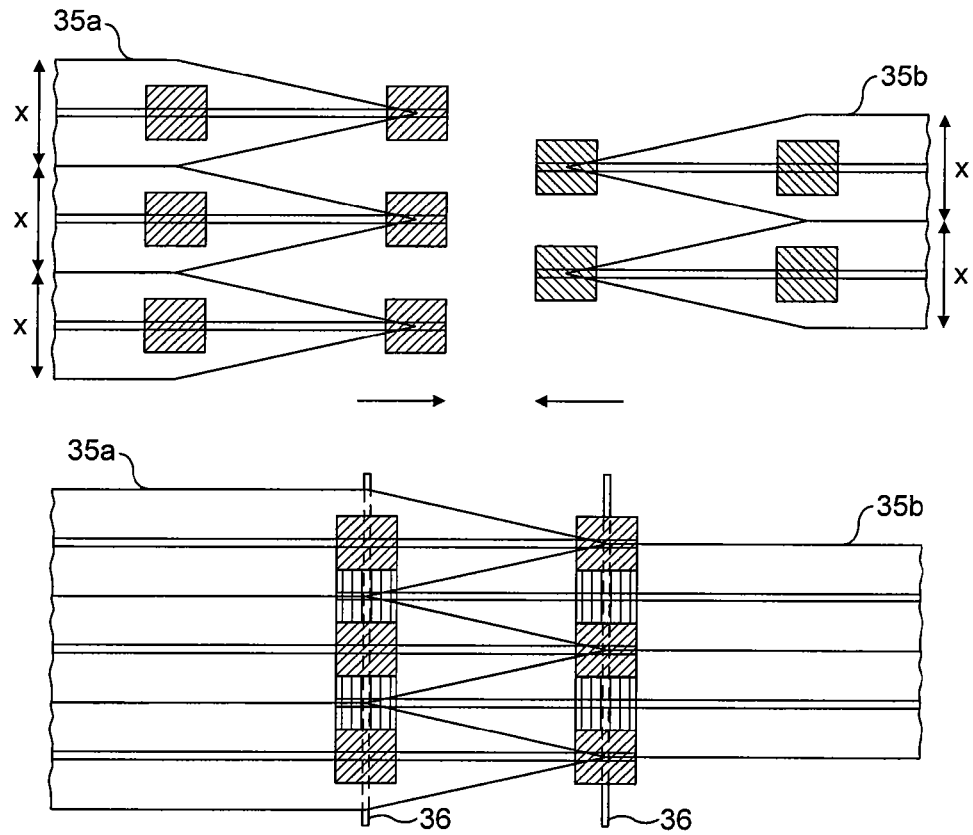
FIG. 16 is an schematic exploded plan view of a join between two spar units forming the spar of FIG. 1.
Figure 17:
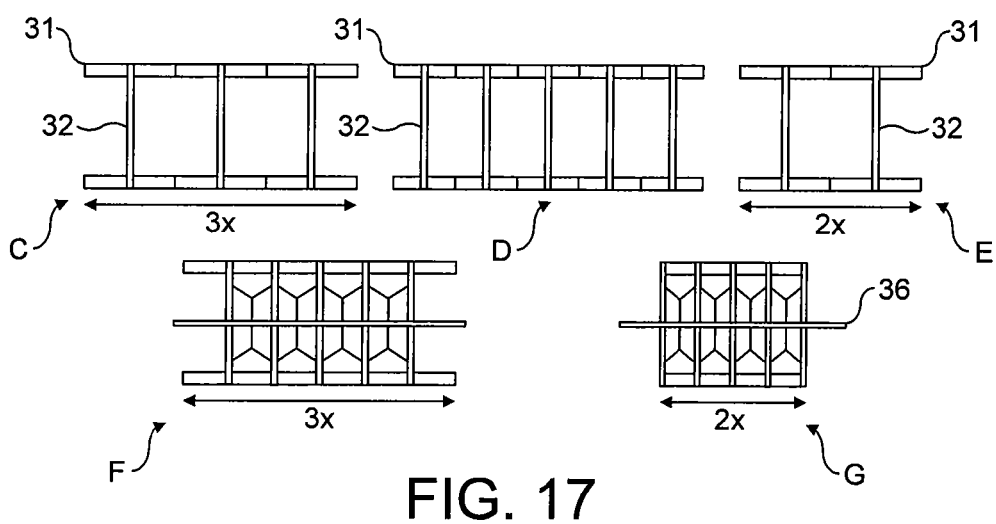
FIG. 17 is a schematic view in plan and cross-section of a completed join between two spar units forming the spar of FIG. 1.

FIG. 16 shows two spar units 35a, 35b prior to connection and FIG. 17 shows the two spar units 35a, 35b connected together by shear pins 36. As shown, the webs 32 of the adjacent spar units 35a, 35b overlap at the join. The mechanical connection between the adjacent spar units 35a, 35b is made via the webs 32 only. The tapered edges of the flanges 31 abut one another but are not physically connected in this example. In an alternative example, the webs 32 of the adjacent spar units 35a, 35b may be alternatively or additionally adhered together via blocks 34. In a further alternative example, the flanges 31 of the adjacent spar units 35a, 35b may be connected by mechanical fixings and/or by adhesive.

Figure 18A:
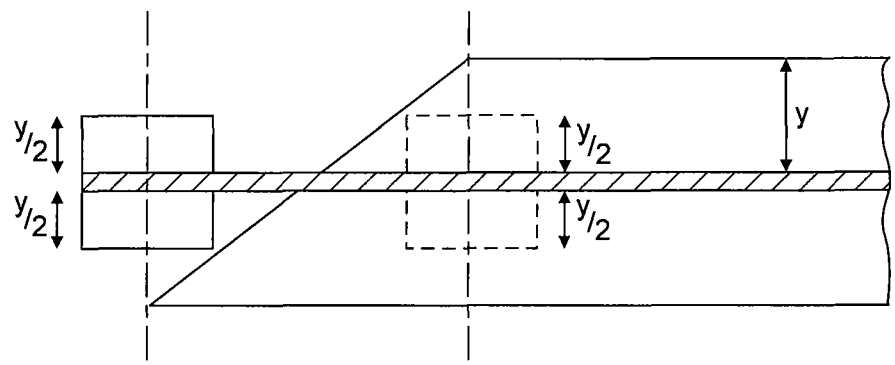
FIGS. 18A and 18B are schematic plan views of alternative end configurations for the open-section beam shown in FIG. 15.
Figure 18B:
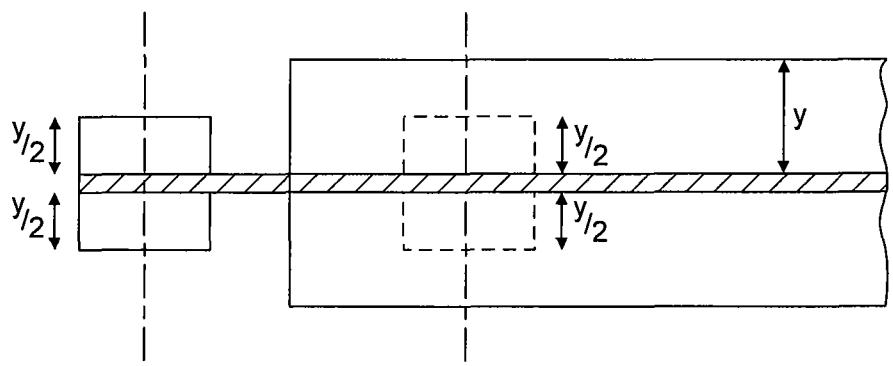

Spar unit 35a comprises three I-beams 33 and spar unit 35b comprises two I-beams 33. However, this is for the purposes of illustration only, the spar units 35 being formable of any number of I-beams 33 and/or channel beams 38 as desired. Similarly, the ends of the flanges 31 need not necessarily be tapered as shown in FIGS. 15, 16 and 17. Alternative end configurations for the flanges 31 are shown in FIGS. 18A and 18B.

Figure 19:
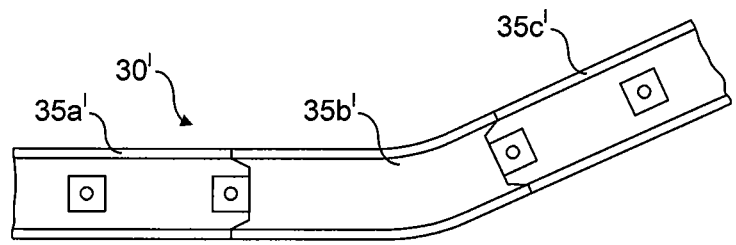
FIG. 19 is a schematic side view of an alternative spar arrangement.
Figure 20:
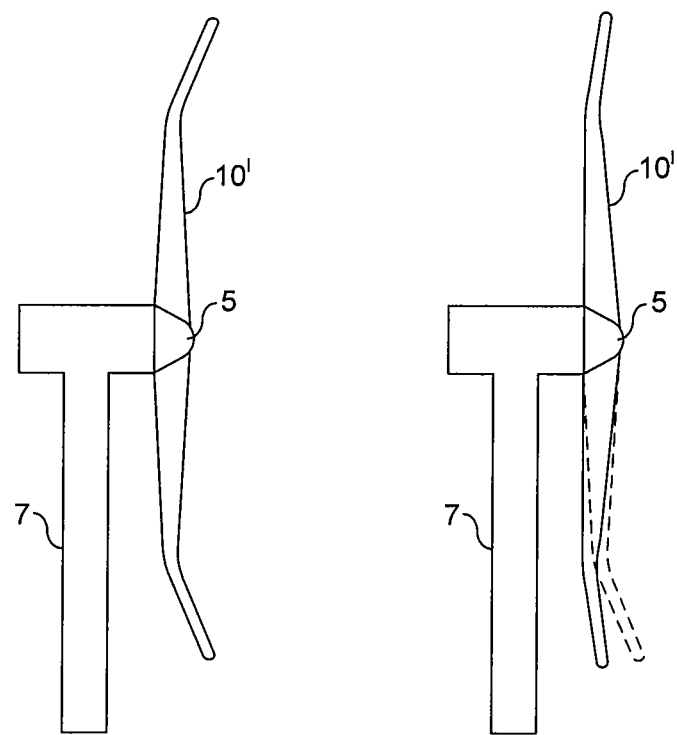
FIG. 20 is a schematic side view of a wind turbine with blades having the spar of FIG. 18.

FIG. 20 shows a blade 10' having a curved configuration which deflects back to a straighter shape under load and FIG. 19 shows a spar 30' for use within the blade 10'.

The spar 30' consists of a plurality of spar units 35a', 35b', 35c' connected together end to end. Spar units 35a', 35c' are substantially straight and are made of composite open-section beams 33 as described above. However, spar unit 35b' has a curved configuration.

The spar unit 35b' is connected at either end to the substantially straight spar units 35a', 35c' so that the tip of the spar 30', and thus the tip of the blade 10', is closer to windward when the blade 10' is mounted on a hub 5 in an unloaded configuration.

The spar unit 35b' has a modular open-section beam construction as described above in respect of the substantially straight spar units 35a', 35c'. In an alternative example, the curved spar unit 35b' and/or the substantially straight spar units 35a', 35b' may consist of monolithic cast or machined components. In a further alternative, the curved spar unit 35b' and/or the substantially straight spar units 35a', 35b' may be a combination of metallic and non metallic component parts.

It will be appreciated that the modular wind turbine blades 10, 10' described above are examples only and that other arrangements of the component parts are envisaged. In particular, the component parts may be made of any suitable material including plastics, fibre reinforced plastics, wood, aluminium and steel. Furthermore, the material of the component parts need not be consistent throughout the blade structure. Specifically, different materials may be used in different sections of the spar 30, 30' as load requirements dictate.

The invention claimed is:

1. A subassembly for connecting a wind turbine blade to a hub, the subassembly comprising:

a tubular support member, a first end of which is arranged to be connected to the hub; and at least two spaced bulkheads extending across the tubular support member and which are arranged to be supported by the tubular support member, wherein each bulkhead comprises a hole for receiving a spar member of the wind turbine blade inserted from a second end of the tubular support member opposite to the first end, such that, in use, a portion of the spar member is supported within the tubular support member by the bulkheads and such that the spar member extends from the second end of the tubular support member.

2. A subassembly as claimed in claim 1, wherein the bulkheads comprise a bulkhead assembly consisting of at least two parts.

3. A subassembly as claimed in claim 2, wherein the bulkhead assembly comprises support mouldings which are connected to the tubular support member.

4. A subassembly as claimed in claim 3, wherein the tubular support member is tapered from the first end to the second end.

5. A subassembly as claimed in claim 4, wherein one or more of the tubular support member, bulkheads or spar are made from fibre reinforced plastic.

6. A subassembly as claimed in claim 1, wherein the bulkheads are supported within the tubular support member.

7. A subassembly as claimed claim 6, wherein the tubular support member comprises fixing holes disposed at the first end for connection to the hub.

8. A subassembly as claimed in claim 7, wherein the tubular support member is tapered from the first end to the second end.

9. A subassembly as claimed in claim 8, wherein one or more of the tubular support member, bulkheads or spar are made from fibre reinforced plastic.

10. A subassembly as claimed claim 1, wherein the tubular support member comprises fixing holes disposed at the first end for connection to the hub.

11. A subassembly as claimed in claim 1, wherein the tubular support member is tapered from the first end to the second end.

12. A subassembly as claimed in claim 1, wherein one or more of the tubular support member, bulkheads or spar are made from fibre reinforced plastic.

* * * * *